(12) United States Patent
Duma et al.

(10) Patent No.: US 12,025,538 B2
(45) Date of Patent: Jul. 2, 2024

(54) WHITEWATER HELMET EVALUATION SYSTEM AND METHOD

(71) Applicant: VIRGINIA TECH INTELLECTUAL PROPERTIES, INC., Blacksburg, VA (US)

(72) Inventors: Brock Duma, Blacksburg, VA (US); Stefan Duma, Blacksburg, VA (US); Mark Begonia, Christiansburg, VA (US); Steve Rowson, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/817,152

(22) Filed: Aug. 3, 2022

(65) Prior Publication Data

US 2023/0045678 A1    Feb. 9, 2023

Related U.S. Application Data

(60) Provisional application No. 63/229,781, filed on Aug. 5, 2021.

(51) Int. Cl.
*G01M 7/08* (2006.01)
*G01P 15/00* (2006.01)
*G01P 15/08* (2006.01)

(52) U.S. Cl.
CPC .............. *G01M 7/08* (2013.01); *G01P 15/001* (2013.01); *G01P 15/0891* (2013.01)

(58) Field of Classification Search
CPC .. G01M 7/08; G01N 3/32; G01N 3/22; G01N 3/34; G01P 15/001; G01P 15/0891
See application file for complete search history.

(56) References Cited

U.S. PATENT DOCUMENTS

| | | | |
|---|---|---|---|
| 3,331,236 A | 7/1967 | Payne et al. | |
| 5,922,937 A * | 7/1999 | Kowalski | G01N 3/30 73/12.14 |

(Continued)

OTHER PUBLICATIONS

Bailey, A. M., McMurry, T. L., Cormier, J.M., Funk, J.R., Crandall, J.R., Mack, C.D., Myers, B.S., & Arbogast, K.B. (2020). Comparison of laboratory and On-field performance of American football helmets. Annals of Biomedical Engineering, 48(11), 2531-2541. doi:10.1007/s10439-020-02627-5.

(Continued)

*Primary Examiner* — Helen C Kwok
(74) *Attorney, Agent, or Firm* — Perilla Knox & Hildebrandt LLP; Jason M. Perilla

(57) ABSTRACT

Various embodiments relating to methods for evaluating injury mitigation performance of helmets that are used for sports (e.g., whitewater kayaking and rafting) are described. In one embodiment, a method for evaluating injury mitigation performance of a helmet includes applying a first impact configuration to a first helmet and applying a second impact configuration to a second helmet of the same model as the first helmet. The method further includes generating acceleration data based on impacts that occur as part of the first impact configuration and the second impact configuration. The method further includes determining concussion risk values based on the generated acceleration data. The method also includes determining a concussion risk metric based on the concussion risk values and exposure values.

20 Claims, 9 Drawing Sheets

(56) References Cited

U.S. PATENT DOCUMENTS

| | | | | |
|---|---|---|---|---|
| 2004/0074283 | A1* | 4/2004 | Withnall | G01M 7/08 |
| | | | | 73/12.12 |
| 2008/0256685 | A1* | 10/2008 | Lampe | G01M 7/08 |
| | | | | 73/12.14 |
| 2012/0247178 | A1* | 10/2012 | Kis, Jr. | G01N 3/30 |
| | | | | 73/12.04 |
| 2015/0040685 | A1 | 2/2015 | Nicholson et al. | |
| 2015/0046116 | A1 | 2/2015 | Eatwell | |
| 2015/0369694 | A1* | 12/2015 | Neale | G01M 7/08 |
| | | | | 73/12.01 |
| 2016/0021964 | A1* | 1/2016 | Duma | G01N 3/30 |
| | | | | 73/12.04 |
| 2016/0290881 | A1* | 10/2016 | Sicking | G01L 5/0052 |
| 2017/0280814 | A1* | 10/2017 | Tuttle | A42B 3/125 |
| 2018/0172551 | A1* | 6/2018 | Pradeep | G01N 3/30 |
| 2019/0086309 | A1* | 3/2019 | Brandt | A42B 3/04 |
| 2019/0216159 | A1* | 7/2019 | Vanhoutin | A42B 3/127 |
| 2020/0215415 | A1* | 7/2020 | Bologna | G06T 17/00 |
| 2020/0225133 | A1* | 7/2020 | Petel | G01T 1/20186 |
| 2021/0048359 | A1* | 2/2021 | Trexler | G01N 3/066 |
| 2021/0270686 | A1* | 9/2021 | Rogers | G01L 5/0052 |
| 2023/0045678 | A1 | 8/2022 | Duma | |
| 2023/0263255 | A1* | 8/2023 | Rowson | A61B 5/6803 |
| | | | | 73/491 |
| 2023/0263256 | A1* | 8/2023 | Rowson | G01M 7/08 |
| | | | | 2/410 |
| 2023/0389641 | A1* | 12/2023 | Duma | A42B 3/127 |

OTHER PUBLICATIONS

Bland, M. L., McNally, C., Zuby, D. S., Mueller, B. C., & Rowson, S. (2019). Development of the star evaluation system for assessing bicycle helmet protective performance. Annals of Biomedical Engineering, 48(1), 47-57. doi:10.1007/s10439-019-02330-0.

Campolettano, E. T., Gellner, R. A., Sproule, D. W., Begonia, M. T., & Rowson, S. (2020). Quantifying youth football helmet performance: Assessing linear and rotational head acceleration. Annals of Biomedical Engineering, 48(6), 1640-1650. doi:10.1007/s10439-020-02505-0.

EN 1385: 2012 (2013) Helmets for canoeing and whitewater sports. BSI Standards Publication. Whitewater Photography. [Digital image]. Retrieved from https://adventuresonthegorge.com/.

Hershman, L.L., (2001). The U.S. new car assessment program (NCAP): past, present and future. International Technical Conference on Enhanced Safety of Vehicles, Paper No. 2001-06-0245.

Pellman et al.; Concussion in Professional Football: Helmet Testing to Assess Impact Performance—Part 11; Jan. 2006, Neurosurgery, 58(1), 78-96, doi:10.1227/01.neu.0000196265.35238.7c.

Post, A., Oeur, A., Hoshizaki, B., & Gilchrist, M. D. (2013). Examination of the relationship between peak linear and angular accelerations to brain deformation metrics in hockey helmet impacts. Computer Methods in Biomechanics and Biomedical Engineering, 16(5), 511-519. doi:10.1080/10255842.2011.627559.

Rowson, B., Rowson, S., & Duma, S. M. (2015). Hockey star: A methodology for assessing the biomechanical performance of hockey helmets. Annals of Biomedical Engineering, 43(10), 2429-2443. doi:10.1007/s10439-015-1278-7.

Rowson, S., & Duma, S. M. (2011). Development of the star evaluation system for football helmets: Integrating player head impact exposure and risk of concussion. Annals of Biomedical Engineering, 39(8), 2130-2140. doi:10.1007/s10439-011-0322-5.

Rowson, S., & Duma, S. M. (2013). Brain injury prediction: Assessing the combined probability of concussion using linear and rotational head acceleration. Annals of Biomedical Engineering, 41(5), 873-882. doi:10.1007/s10439-012-0731-0.

Rowson, S., Duma, S. M., Greenwald, R. M., Beckwith, J. G., Chu, J. J., Guskiewicz, K. M., Mihalik, J.P., Crisco, J.J., Wilcox, B.J., McAllister, T.W., Maerlender, A.C., Broglio, S.P., Schnebel, B., Anderson, S., & Brolinson, P. G. (2014). Can helmet design reduce the risk of concussion in football? Journal of Neurosurgery, 120(4), 919-922. doi:10.3171/2014.1.jns13916.

Schoen, R. G., & Stano, M. J. (2002). Year 2000 Whitewater Injury Survey. Wilderness & Environmental Medicine, 13 (2), 119-124. doi:10.1580/1080-6032(2002)013[0119:ywis]2.0.co;2.

Solomito, M.J., Reuman, H., Wang, D.H. (2019). Sex differences in concussion: a review of brain anatomy, function, and biomechanical response to impact. Brain Injury, 33(2), 105-110. doi.org/10.1080/02699052.2018.1542507.

Spittler, J., Gillum, R., & DeSanto, K. (2020). Common injuries in whitewater rafting, kayaking, canoeing, and stand-up paddle boarding. Current Sports Medicine Reports, 19(10), 422-429. doi:10.1249/jsr.0000000000000763.

Bland, M.L., McNally, C., and Rowson, S. Headform and Neck Effects on Dynamic Response in Bicycle Helmet Oblique Impact Testing. Proceedings of IRCOBI Conference, 2018. Athens, Greece.

Cobb, B.R., Tyson, A.M., and Rowson, S. Head acceleration measurement techniques: Reliability of angular rate sensor data in helmeted impact testing. Proceedings of the Institution of Mechanical Engineers, Part P: Journal of Sports Engineering and Technology, 2017. p. 1-6.

Hardy, W.N., Mason, M.J., Foster, C.D., et al. A study of the response of the human cadaver head to impact. Stapp Car Crash Journal, 2007. 51:17-80.

International ASTM. Standard specifications for helmets used for recreational snow sports. ASTM International: F2040-18 2019.

Ji, S., Zhao, W., Li, Z., McAllister, T.W. Head impact accelreations for brain strain-related responses in contact sports: a model-based investigation. Biomech Model Mechanobiol, 2014. 13(5): 1121-36.

Kleiven, S. Predictors for Traumatic Brain Injuries Evaluated through Accident Reconstructions. Stapp Car Crash Journal, 2007. 51: p. 81-114.

Ommaya, A.K. Biomechanics of Head Injuries: Experimental Aspects. Biomechanics of Trauma, A. Nahum, J. W. Melvin, Ed. Eat Norwalk, CT: Appleton-Century-Crofts, 1985.

Rousseau, P., Hoshizaki, T.B., and Gilchrist, M.D. Estimating the influence of neckform compliance on brain tissue strain during a helmeted impact. Stapp Car Crash Journal, 2010. 54: p. 37-48.

Rowson, S., Duma, S.M., et al. Rotational head kinematics in football impacts: an injury risk function for concussion. Annals of Biomedical Engineering, 2012. 40(1): p. 1-13.

Steenstrup S.E., Mok K.M., McIntosh A.S., Bahr R., Krosshaug T. Head impact velocities in FIS World Cup snowboarders and freestyle skiers: Do real-life impacts exceed helmet testing standards? British journal of sports medicine. 2018;52(1):32-40.

B. R. Cobb, A. MacAlister, T. J. Young, A. R. Kemper, S. Rowson, and S. M. Duma, "Quantitative comparison of Hybrid III and National Operating Committee on Standards for Athletic Equipment headform shape characteristics and implications on football helmet fit," Proceedings of the Institution of Mechanical Engineers, Part P: Journal of Sports Engineering and Technology, vol. 229, No. 1, pp. 39-46, 2015.

B. R. Cobb, A. M. Zadnik, and S. Rowson, "Comparative analysis of helmeted impact response of Hybrid III and National Operating Committee on Standards for Athletic Equipment headforms," Proceedings of the Institution of Mechanical Engineers, Part P: Journal of Sports Engineering and Technology, vol. 230, No. 1, pp. 50-60, 2016.

* cited by examiner

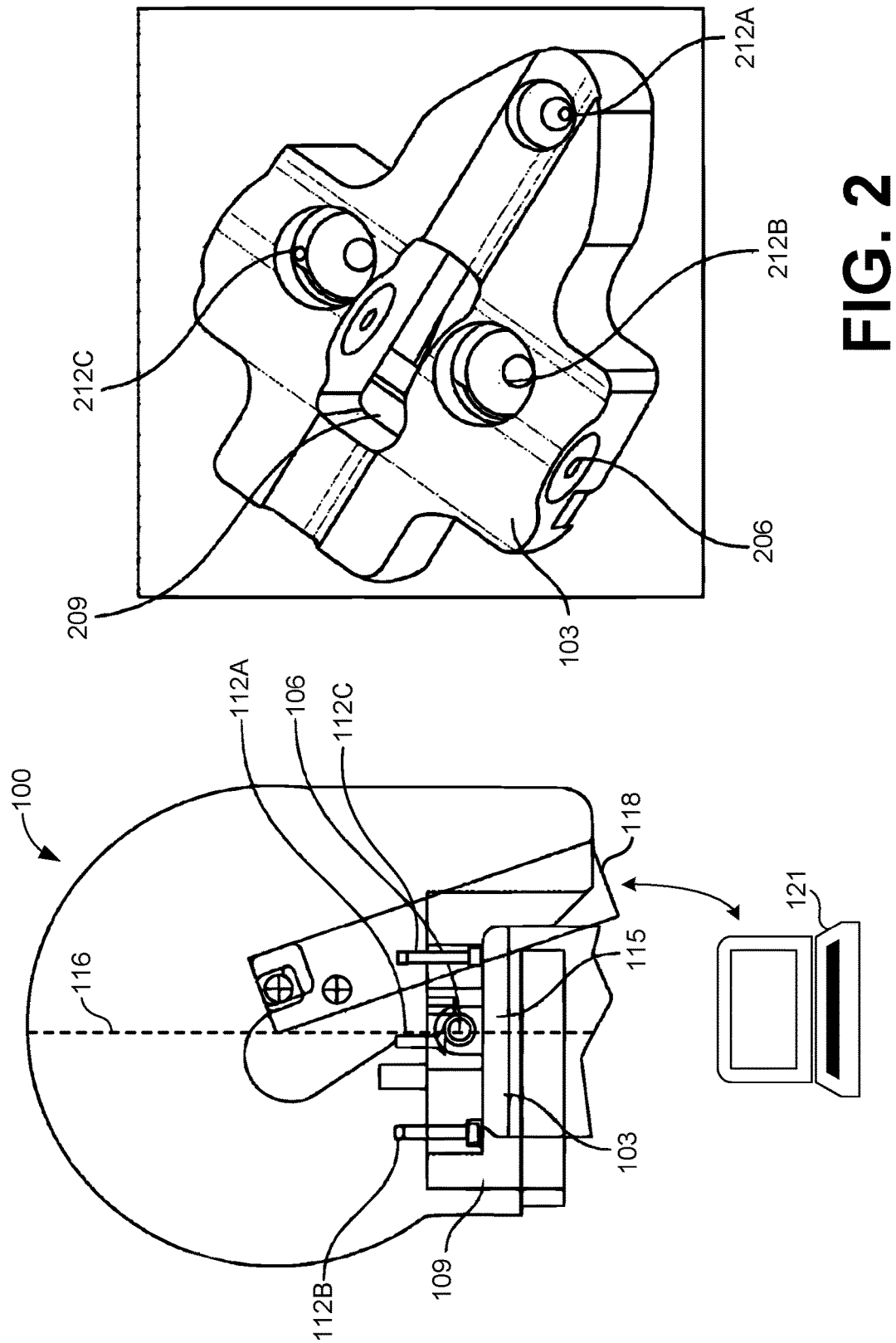

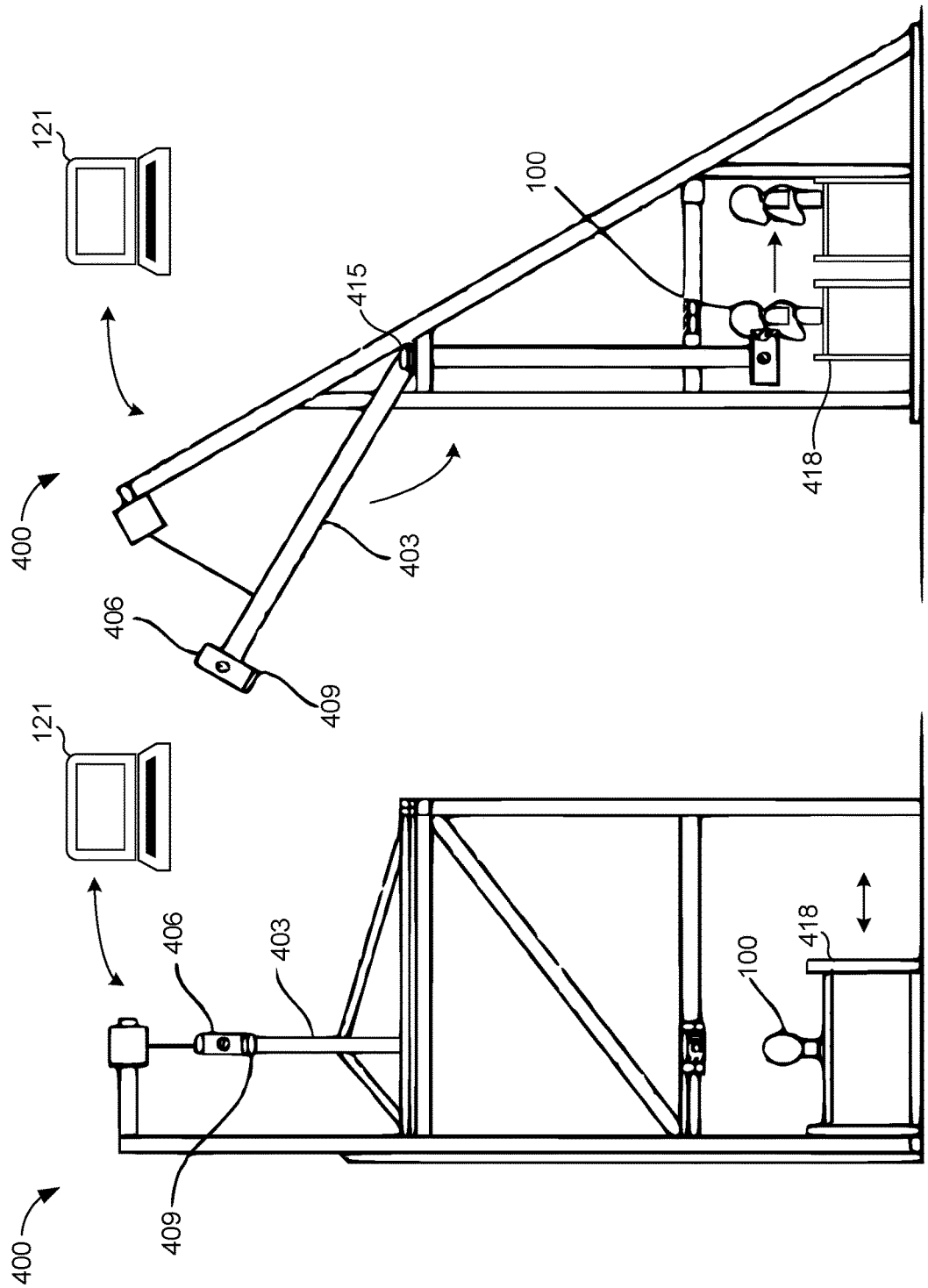

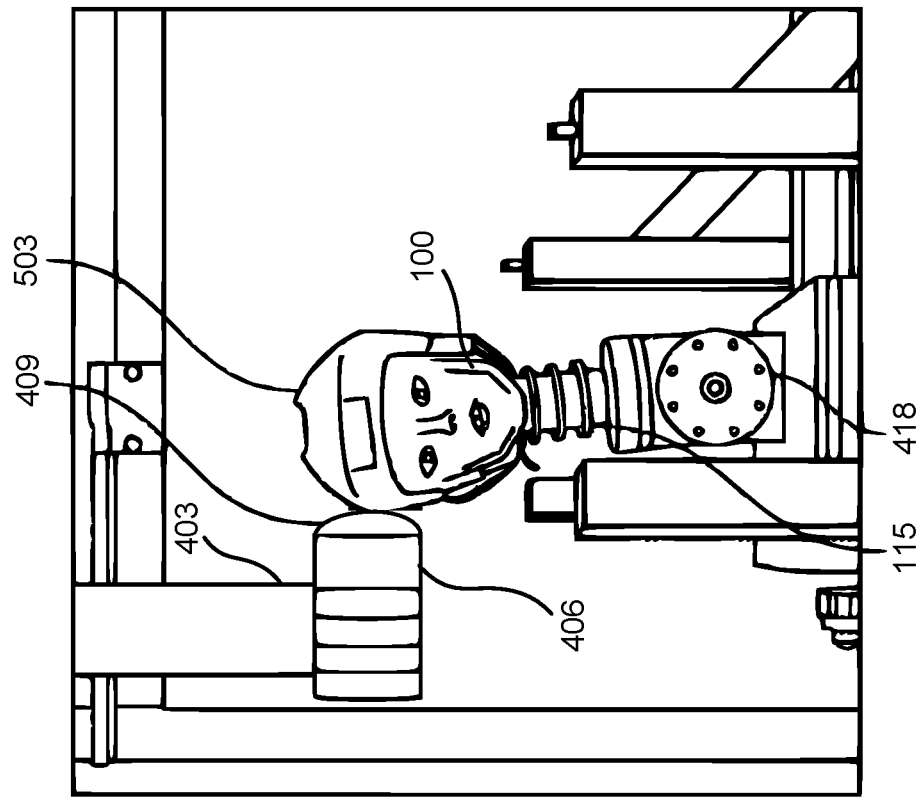
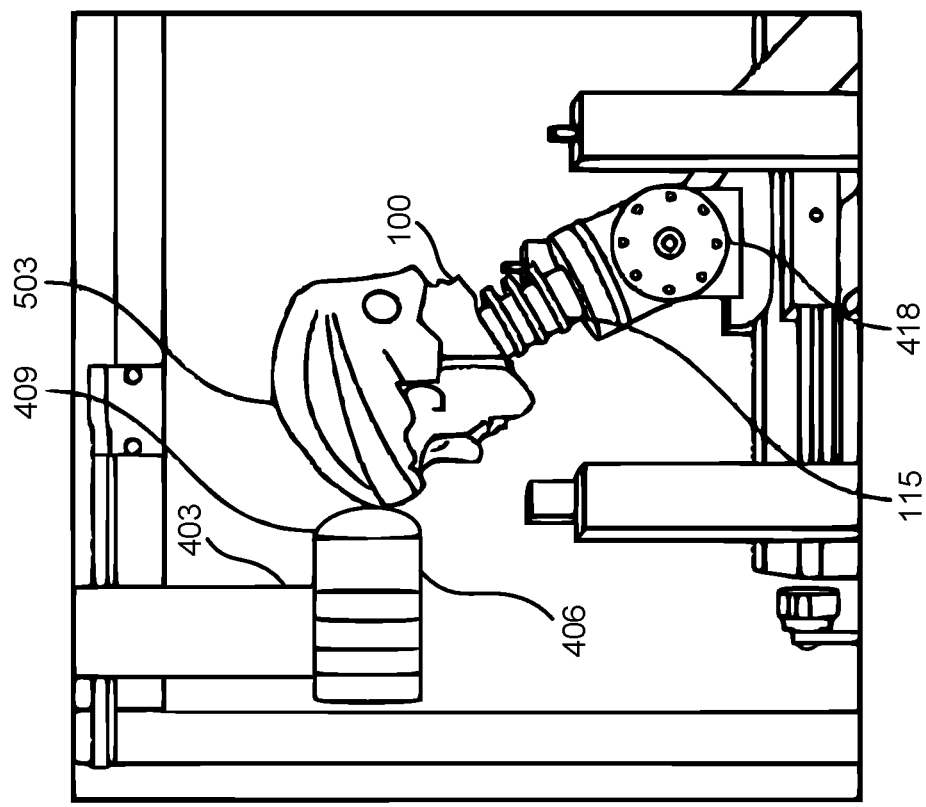

WHITEWATER HELMET EVALUATION SYSTEM AND METHOD

CROSS REFERENCE TO RELATED APPLICATIONS

This application claims the benefit of and priority to U.S. Provisional Application Ser. No. 63/229,781, filed Aug. 5, 2021, titled "WHITEWATER HELMET STAR SYSTEM," the entire contents of which are hereby incorporated herein by reference.

BACKGROUND

More than six million people participate in whitewater kayaking and rafting in the United States each year. Unfortunately, with these six million whitewater participants come 50 deaths annually, making it one of the highest fatality rates of all sports. As the popularity in whitewater activities grows, the number of injuries, including concussions, also increases. Acute injuries account for 58% of whitewater injuries, with 47% being musculoskeletal injuries. Acute head injuries occur from either contact with other paddler's equipment or from contact with objects outside of the vessel, such as rocks. Head, neck, and face injuries are frequent among paddlers across all skill levels, and they are considered to be the most severe. Of all possible injuries, head injuries are the most life threatening. The head injuries are so severe that 77% of participants who sustain head injuries require medical attention.

The most common mechanism of whitewater head injuries is contact against underwater objects with the forehead area and the side of the eye socket. This primarily occurs when a participant either capsizes or falls out of the vessel. Once in fast-moving rapids, hidden rocks and other rigid objects beneath the water's surface pose a high risk of head injury and death. Severe head impact events often cause a participant to become unconscious, which then leads to death due to drowning. The highest recorded flow rate of a whitewater river is 5 m/s, which implies that it is very unlikely that any underwater head impact will have a head impact velocity greater than 5 m/s. Because of the high head injury risk, there is a high helmet usage rate among whitewater sports.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 illustrates a cross sectional view of an example headform that can be used for impact testing of helmets in accordance with various embodiments of the present disclosure.

FIG. 2 illustrates an adapter that can be used to connect the example headform shown in FIG. 1 to a neck structure in accordance with various embodiments of the present disclosure.

FIG. 4A illustrates a pendulum impact testing apparatus in a resting position in accordance with various embodiments of the present disclosure.

FIG. 4B illustrates the pendulum impact testing apparatus impacting the example headform shown in FIG. 1 in accordance with various embodiments of the present disclosure.

FIGS. 5A-5C illustrate close-up views of an impactor striking various locations of a helmet positioned on the example headform shown in FIG. 1 in accordance with various embodiments of the present disclosure.

DETAILED DESCRIPTION

Figure 3:
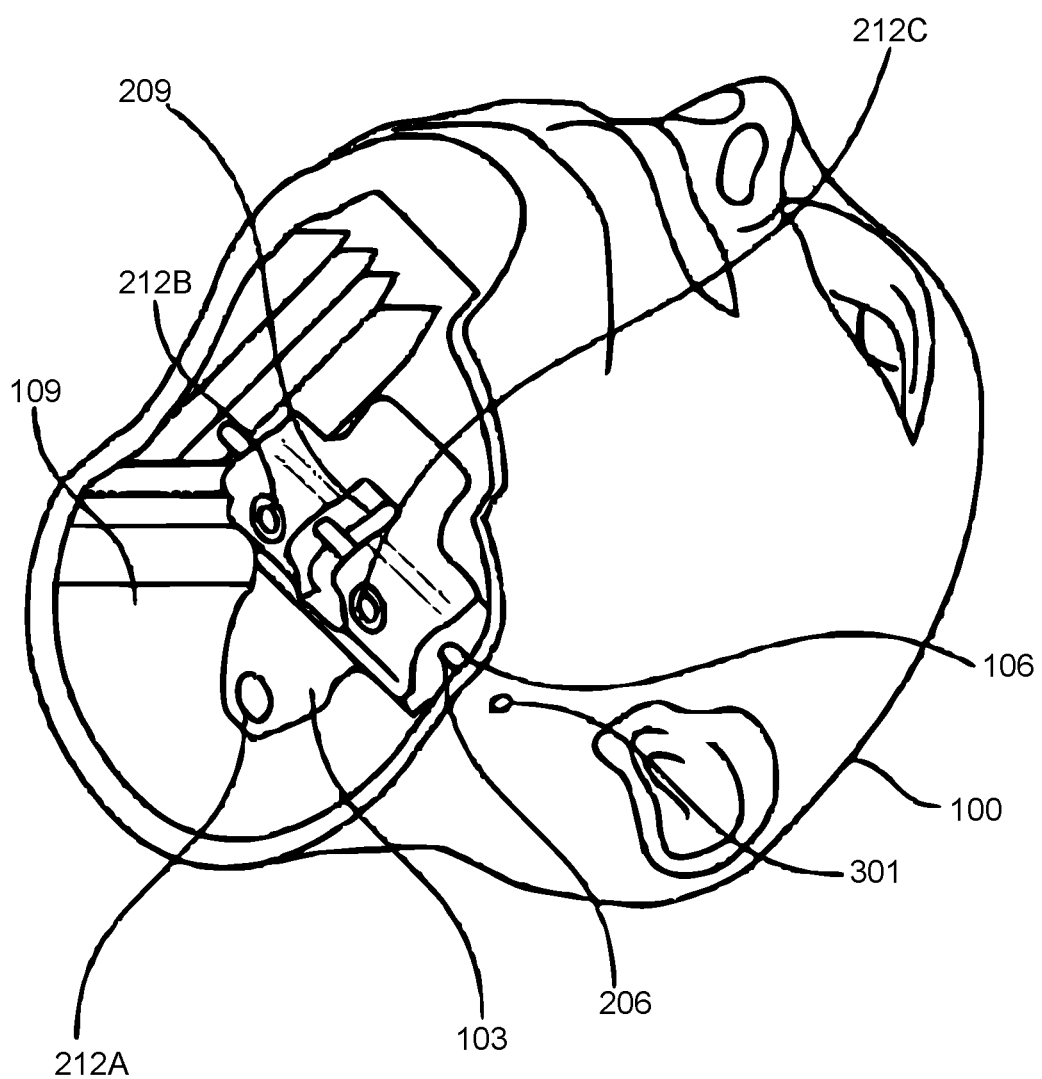
FIG. 3 illustrates a side view of the example headform shown in FIG. 1 with the adapter secured to the example headform in accordance with various embodiments of the present disclosure.

Aspects of the present disclosure relate to methods for evaluating injury mitigation performance of helmets that are used for sports or activities requiring protective head equipment (e.g., whitewater kayaking and rafting). Current whitewater helmet evaluation standards are similar to many historical helmet evaluation standards and typically evaluate only a linear acceleration component. However, both linear and angular acceleration occur during head impacts, and it is important to evaluate angular acceleration relative to brain injuries as part of impact testing of helmets. By lowering both linear and angular acceleration in laboratory tests, it has been shown that brain injury risk is lowered in real-world head impact events. Given the serious head injuries observed in whitewater sports, both linear and angular acceleration measures should be analyzed when evaluating the biomechanical performance of helmets for whitewater sports and similar activities.

According to various embodiments, a testing method can measure or evaluate the concussion mitigation performance of helmets (e.g., whitewater helmets) used for sports, such as for whitewater sports or activities. The method is referenced herein as a Summation of Tests for the Analysis of Risk (STAR) method in some examples, but variations of the method can be practiced based on the concepts described herein, regardless of the use of any shorthand names. Although the embodiments of the present disclosure will discuss the STAR method with reference to whitewater helmets, any suitable helmet used for sports or similar activities may be evaluated using the STAR method described herein.

The STAR method combines impact testing of helmets with an injury risk function as well as exposure data to generate a summary of helmet performance. Impact testing of helmets may be carried out with various dummy headforms that are mounted on various dummy necks. For example, one such configuration can include a whitewater helmet positioned on a NOCSAE® headform that has been mounted on a Hybrid III neck. The NOCSAE® headform and the Hybrid III neck correspond to one example configuration, and other configurations involving dummy headforms and necks may be used for impact testing without departing from the spirit and scope of the embodiments presented herein.

Instrumentation can be positioned within the headform that measures linear acceleration, angular velocity, angular acceleration, and other inertial measurements. In some cases, angular acceleration may be determined from measured angular velocity. Impact tests can be performed at a range of impact locations and energy levels that include both centric and non-centric impact configurations, which can impact the evaluation of concussion mitigation performance. For each impact test, the peak linear and angular acceleration values are inserted into a brain injury risk function, and the values from the brain injury risk function can be multiplied by an exposure value to obtain a weighted risk value.

The weighted risk values from the impact tests can be further evaluated using a function or equation. The function or equation aggregates the data from the impact tests into a number or metric, as a score representative of the performance of helmets. The score can then used to categorize helmets into a rating system that includes numerical ranges (e.g., 0-5 with 5 being the best performing category). Helmets with higher ratings do a better job of managing impact energy and ultimately lowering the linear and angular acceleration values the head would experience for a given impact. The appeal of the rating system is that it can differentiate complex helmet performance into usable information for consumers. Moreover, on-field studies have shown brain injury reduction rates in athletes who wear higher rated helmets.

Turning to the drawings, FIG. 1 shows a cross sectional view of a headform 100 that can be used for impact testing of helmets (e.g., whitewater helmets) used for sports or other activities according to the methods described herein. The headform 100 includes an opening 109 in a lower region (toward the chin of the headform 100), a sensor package 118, fasteners 112A-112C, an occipital condyle pin 106, and an adapter 103.

FIG. 1 also illustrates a portion of a neck 115 that attaches to the headform 100 through the adapter 103 at the opening 109. The adapter 103 can be used to mount the headform 100 to the neck 115. In this respect, the adapter 103 can include a custom adapter plate that provides anatomically accurate relative locations of the occipital condyle pin 106 and center of gravity 116 of the headform 100. In some embodiments, the headform 100 and the neck 115 can include a NOCSAE® headform and a Hybrid III 50$^{th}$ percentile neck, respectively. However, other combinations of dummy headforms and necks can be used to conduct the impact tests discussed herein. A detailed view of the adapter 103 is illustrated in FIG. 2. A side view of the headform 100 with the attached adapter 103 is illustrated in FIG. 3.

The adapter 103 can include mounting holes 212A-212C, which can receive fasteners 112A-112C located within the headform 100, to secure the headform 100 to the adapter 103. As such, the adapter 103 can improve the anatomical accuracy of the location of the center of gravity 116 of the headform 100. A bore 206 in the adapter 103 and opening 301 (shown in FIG. 3) in the headform 100 can be matched to receive the occipital condyle pin 106. An opening 209 in the adapter 103 can be used to connect the neck 115 to the headform 100. The adapter 103, through the mounting holes 212A-212C and the fasteners 112A-112C, enable the headform 100 to be secured in a position that allows impact testing of helmets (e.g., whitewater helmets) used for sports, such as for whitewater sports or related activities. The headform 100 can include various types of dummy headforms, such as the NOCSAE® headform, that are suitable for fitting whitewater helmets. The neck 115 can include various types of dummy necks, such as the Hybrid III 50$^{th}$ percentile male neck, that can be attached to the headform 100 and is suitable for impact testing of helmets.

The sensor package 118 can be attached near the center of gravity 116 of the headform 100. The sensor package 118 can include multiple accelerometers, angular rate sensors, or other inertial measurement or sensor units that measure linear acceleration, angular velocity, angular acceleration, and other inertial metrics generated by head impacts during testing of helmets, such as whitewater helmets. In some embodiments, the sensor package 118 can include a six degree of freedom (6DoF) sensor package that includes three accelerometers and a triaxial angular rate sensor. However, other quantities and combinations of linear accelerometers, angular accelerometers, and angular rate sensors can be employed within the headform 100 to measure linear acceleration, angular velocity, and/or angular acceleration. In some cases, angular acceleration values may be determined based on the angular velocity data.

The sensor package 118 can be embodied as one or more accelerometers. As one example, the sensor package 118 is capable of measuring acceleration (i.e., the rate of change of velocity) as compared to its own instantaneous rest frame and provide feedback signals or data representative of the acceleration. The accelerometers of the sensor package 118 can be single or multi-axis accelerometers, capable of detecting both the magnitude and the direction of the acceleration in some cases, as a vector quantity. In some cases, the sensor package 118 can be an inertial measurement unit (IMU) capable of also measuring orientation, positional angular information, velocity, and other inertial information related to the headform 100. Thus, the sensor package 118 can also sense orientation, coordinate acceleration, vibration, shock, and falling motions in some cases. Examples of the accelerometers of the sensor package 118 can include accelerometers from Endevco®, Piezotronics®, Dytran®, Honeywell®, Bosch®, and other manufacturers.

The sensor package 118 can be in data communication with computing device 121. The computing device 121 can include one or more processing circuits, for example, having processors and memories or memory devices, which can be coupled to a local interface for data communication. The processing circuits of the computing device 121 can process data, as described herein, such as linear acceleration data, angular velocity data, angular acceleration data, and other types of data. In some cases, the computing device 121 can include data sampling, filtering, and processing devices or systems, for processing data from the sensor package 118. The computing device 121 can also include power sources, such as batteries or other power sources. The local interfaces of the computing device 121 can be embodied as wired, wireless, or wired and wireless local interfaces. The sensor package 118 may communicate with the computing device 121 through one or more wired, WiFi, Bluetooth®, near-field communication (NFC), radio-frequency identification (RFID), wireless infrared, ultra wideband, wireless induction, long range (LoRa), Z-Wave®, ZigBee®, etc., interfaces.

FIGS. 4A-4B illustrate various views of a pendulum impact testing apparatus 400 that can be used to impact the headform 100 during impact testing of helmets. As discussed previously, the testing methods described herein incorporate impact testing of helmets and use of a concussion risk function to analyze linear and angular acceleration values resulting from the said impact tests. The pendulum impact testing apparatus 400 includes a movable arm 403, an impactor 406, an impactor face 409, a pivot point 415, and a sliding mass 418. The pendulum impact testing apparatus 400 can be used to conduct the impact testing portion of the testing methods. Use of the pendulum impact testing apparatus 400 is beneficial in that it enables an easily repeatable system to conduct the impact tests.

In one embodiment, the movable arm 403 can be composed of a 10.16×5.8 cm rectangular aluminum tubing, with the impactor 406 having a mass of 16.3 kg. The length of the arm 403 from the center of the pivot point 415 to the center of the impactor 406 can be 190.5 cm. The arm 403 can have a total mass of 36.3 kg and a moment of inertia of 72 kg·m². The impactor face 409 can be constructed of nylon and have a diameter of 20.3 cm and a radius of curvature of 12.7 cm. The impactor face 409 can be designed to mimic a rock or other rigid surface a whitewater participant might impact, which can maximize repeatability and reproducibility of the impact tests. The pendulum impact testing apparatus 400 can be controlled by a winch system equipped with an electromagnet attached to the arm 403 in order to raise and release it at desired angles correlated with various velocities. In some cases, the winch system may be pneumatically or hydraulicly driven. Other pendulum impact testing apparatuses and related impact testing tools can be relied upon to gather impact data for evaluation using the concussion risk functions described herein.

In addition, components of the impact testing apparatus 400 may be controlled or directed, at least in part, by the computing device 121. For example, the computing device 121 may be in data communication with the winch system to control the angle and velocity at which the impactor 406 impacts a whitewater helmet on the headform 100 using electromechanical actuators, switches, motors, and other systems. The impact testing apparatus 400 may communicate with the computing device 121 through one or more wired, WiFi, Bluetooth®, near-field communication (NFC), radio-frequency identification (RFID), wireless infrared, ultra wideband, wireless induction, long range (LoRa), Z-Wave®, ZigBee®, etc., interfaces. According to one embodiment, the pendulum impact testing apparatus 400 can be configured so that the impactor face 409 strikes the helmet on the headform 100 at either 3.1 m/s or 4.9 m/s.

In order to carry out the impact tests, a helmet is first positioned on the headform 100. As discussed previously, the headform 100 and the neck 115 can include a NOCSAE® headform and a Hybrid III 50$^{th}$ percentile male neck, respectively. The NOCSAE® headform can be mounted to the Hybrid III 50$^{th}$ percentile male neck using the adapter 103, which provides anatomically accurate relative locations of the occipital condyle pin 106 and the center of gravity 116 of the headform 100. The headform 100 and the neck 115 are then positioned on the sliding mass 418. The sliding mass 418 can be designed to simulate the effective torso mass of a 50$^{th}$ percentile male during a head impact according to one example, thereby increasing the biofidelity of the impact configuration. In one example, the sliding mass 418 can be mounted to an adjustable table commonly used for impact testing.

The impactor 406 provides an impacting mass that is adjustable to emulate a full range of head impact characteristics experienced by individuals, such as participants in whitewater or related activities. In this regard, the impactor face 409 may be of a certain shape, size, and weight that emulates the aforementioned characteristics of objects whitewater participants may frequently come into contact with to cause injury. In some cases, the impactor face 409 may be curved to emulate the shape of a rock since many injuries caused in whitewater sports involve head contact with a rock in water. When activated, the arm 403 pivots from the pivot point 415 causing the impactor face 409 to strike the helmet on the headform 100.

FIG. 4A illustrates the pendulum impact testing apparatus 400 in its resting position before activation. The arm 403 has not yet been activated, and the headform 100 positioned on the sliding mass 418 is in its starting position. FIG. 4B illustrates the pendulum impact testing apparatus 400 that has been activated. In some cases, the pendulum impact testing apparatus 400 can be controlled by the computing device 121, allowing for the velocity and angle of impact to be configured in an automated fashion based on control of a user interface of the computing device 121. In some cases, the pendulum impact testing apparatus 400 may be manually configured by a user (e.g., user who controls the winch system). When the arm 403 pivots from the pivot point 415 and the impactor surface 409 strikes the helmet on the headform 100, the sliding mass 418 and the headform 100 may change positions as depicted.

Figure 5C:
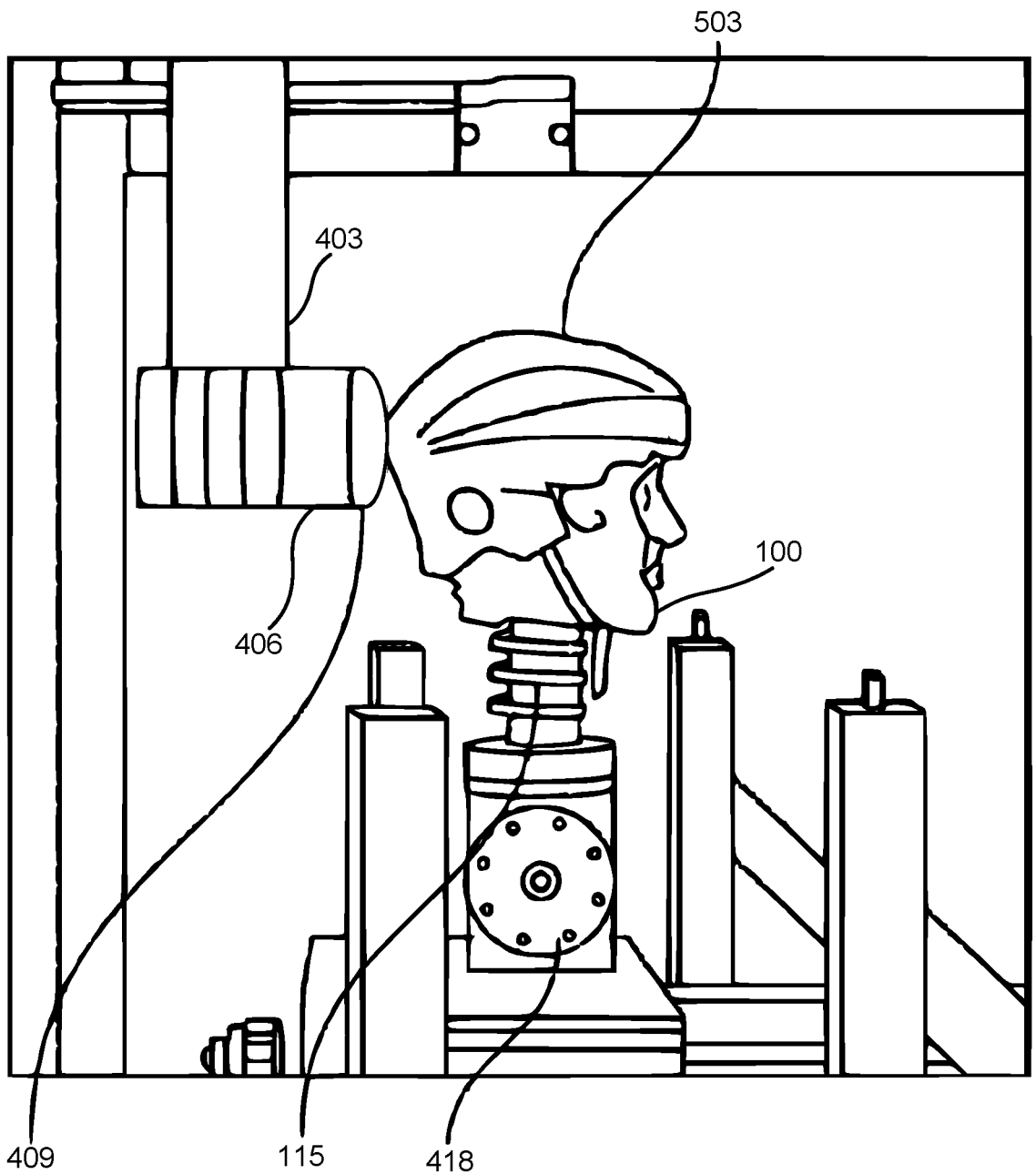

FIGS. 5A-5C illustrate a close-up view of the impactor face 409 striking various locations of a helmet 503 positioned on the headform 100. The helmet 503 can include any helmet that is used for sports or other activities requiring protective head equipment, such as for whitewater activities (e.g., whitewater kayaking and rafting). In this respect, the helmet 503 includes various models of watersport helmets marketed for whitewater use. The table below lists a total of 21 helmet models that were tested according to the methods in accordance with the embodiments discussed herein:

TABLE 1

| 21 Helmet Models for Testing with Respective Price and Weight | | | | |
|---|---|---|---|---|
| Manufacturer | Helmet Model | Price ($) | Mass (g) | Abbreviation |
| Shred Ready | Fullface Whitewater Helmet | 149.95 | 705 | FF |
| Shred Ready | Outfitter Pro Helmet | 49.00 | 360 | O |
| Shred Ready | Shaggy Helmet | 179.95 | 535 | SH |
| Shred Ready | SESH Helmet | 54.95 | 495 | SE |
| Shred Ready | Halfcut Whitewater Helmet | 99.95 | 505 | H |
| Shred Ready | Fullcut Whitewater Helmet | 110.00 | 585 | FC |
| Shred Ready | Super Scrappy Whitewater Helmet | 89.95 | 485 | SS |
| WRSI | Trident Composite | 199.95 | 565 | T |
| WRSI | Moment Fullface | 179.95 | 805 | M |
| WRSI | Current Pro | 139.95 | 715 | CP |

TABLE 1-continued

21 Helmet Models for Testing with Respective Price and Weight

| Manufacturer | Helmet Model | Price ($) | Mass (g) | Abbreviation |
|---|---|---|---|---|
| WRSI | Current | 119.95 | 595 | C |
| NRS | Chaos Side Cut Helmet | 79.95 | 565 | CS |
| NRS | Chaos Full Cut Helmet | 69.95 | 510 | CF |
| NRS | Havoc Livery Helmet | 49.95 | 420 | HL |
| Sweet Protection | Rocker Fullface Helmet | 329.95 | 730 | RF |
| Sweet Protection | Rocker Helmet | 229.95 | 530 | R |
| Sweet Protection | Strutter Helmet | 199.95 | 515 | ST |
| Sweet Protection | Wanderer Helmet | 149.95 | 580 | W |
| Sweet Protection | Sweet Rocker - Dagger Edition | 259.99 | 530 | SR |
| Gath | Gath Gedi | 189.00 | 430 | G |
| Gath | Gath RV | 209.00 | 550 | RV |

Every helmet in the table above was certified to the EN: 1385: Whitewater Helmet Standard. This ensures that regardless of the outcomes of the test results discussed herein, the helmets have already passed the range of basic safety tests included in the standard. The selection of the above listed helmets based on passing the Whitewater Helmet Standard is consistent with selection of helmets in previous studies for other sports (e.g., football, hockey, cycling, etc.) based on acceptable standards in the respective sport.

The methods described herein, for use with whitewater helmets, relies upon impact tests conducted at multiple locations of the helmet 503. In one embodiment, two impact configurations can be used to test the model of the helmet 503 for a total of six impact tests. These configurations can be defined as three impact locations of the helmet 503 at two different impact velocities. The three different locations include a front of the helmet 503, a side of the helmet 503, and a rear of the helmet 503. The two different velocities are configurable by the user but were selected as 3.1 m/s and 4.9 m/s, in one example, for testing of whitewater helmets to replicate a medium and high energy impact according to one experiment that was conducted. The velocity of 4.9 m/s was chosen to correlate to the highest recorded flow rate of a river, which is 5 m/s. Other impact velocities can be relied upon in some cases.

To generate accurate test results, each impact location of the helmet 503 may be impacted only once. That is, to apply the two impact configurations to the helmet 503, which requires a total of six impacts (i.e., three impacts at a first impact velocity and three impacts at a second impact velocity), a second helmet of the same model as the helmet 503 can be used. Thus, the helmet 503 and the second helmet can be impacted at the aforementioned three locations but at different velocities by the impactor face 409. Each impact location being impacted only once may ensure that any deformation caused by testing does not affect any future tests. Conducting the impact tests with the six impact configurations can result in a total test matrix of 126 tests.

With the impact tests occurring at multiple locations on the helmet 503, FIGS. 5A-5C depict the impactor face 409 impacting the front of the helmet 503, the side of the helmet 503, and the rear of the helmet 503, respectively. When the helmet 503 is impacted, resultant linear and angular acceleration is generated by the sensor package 118 based on translations and rotations of the headform 100 on the sliding mass 418. The resultant linear and angular acceleration values that are generated by the sensor package 118 are used to calculate a concussion risk value for each impact based on a concussion risk function. The concussion risk value(s) are then used to determine a concussion risk metric for the helmet 503.

The impactor face 409 is curved to simulate the surface of a rock since many injuries caused in whitewater sports involve head contact with a rock in water. However, other impactor surfaces of a different shape, weight, and surface can be used to simulate other injury contact surfaces that may be prevalent in a corresponding sport. In some embodiments, fewer or greater than two impact configurations may be used to conduct impact testing of the helmet 503. That is, any one of the three aforementioned impact locations may or may not be impacted, and a second helmet of the same model as the helmet 503 may or may not be used. In some cases, more than two helmets of the same model may be tested.

However, each impact location being tested once is an important consideration that can be factored in when applying the concussion risk function, which will be discussed in detail in the following paragraphs with respect to the flowchart shown in FIG. 6. In addition, participants of whitewater activities generally undergo one major head impact annually. According to one embodiment, this statistic was considered in deciding that the three impact locations be impacted only once for a given whitewater helmet in accordance with the methods described herein.

Figure 6:
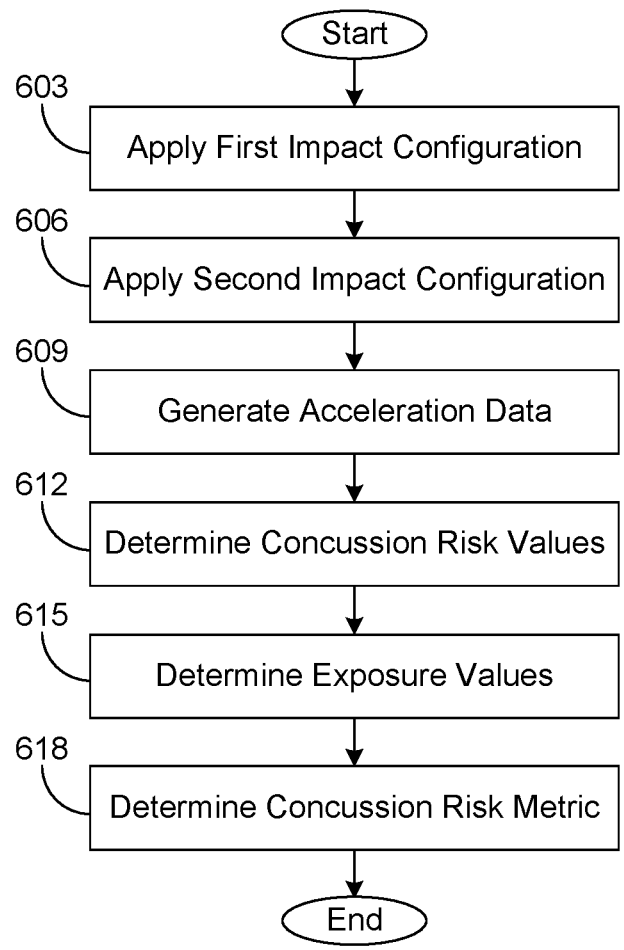
FIG. 6 is a flowchart illustrating exemplary steps of a method to evaluate concussion mitigation performance of helmets in accordance with various embodiments of the present disclosure.

FIG. 6 is a flowchart outlining the steps of a method for evaluating the concussion mitigation performance of helmets (e.g., whitewater helmets) or protective head gear used in sports or similar activities. In box 603, a first impact configuration is applied to a helmet that is selected for testing. For example, referring back to FIGS. 4A-5B, the helmet 503 is selected for testing of concussion mitigation performance. The helmet 503, which can include various whitewater helmets, is positioned on the headform 100 based on the helmet manufacturer's fitting guidelines. The headform 100 can be mounted to the neck 115 using the adapter 103. The headform 100 and the neck 115 can be mounted to the sliding mass 418 and can be positioned within an impact area of the pendulum impact testing apparatus 400.

The first impact configuration can include impacts to multiple locations on the helmet 503 with a first impact velocity. In accordance with one example, as shown in FIGS. 5A-5C, the pendulum impact testing apparatus 400 and the headform 100 can be configured so that the impactor 406 impacts the side of the helmet 503, the front of the helmet 503, and the rear of the helmet 503, for a total of three impact locations. However, other locations of the helmet 503 may be impacted in some cases. In some cases, the pendulum impact testing apparatus 400 can be controlled by a winch system equipped with an electromagnet in order to raise and release the movable arm 403 at desired angles corresponding to a desired impact velocity. In some cases, the winch system may be pneumatically or hydraulically driven. In some cases, the pendulum impact testing apparatus 400 may also be controlled by the computing device 121.

Moving on to box 606, a second impact configuration is applied to a second helmet that is the same model as the helmet selected and used for testing at box 603. Referring back to FIGS. 5A-5C, the helmet 503 that is positioned in the headform 100 may be a certain model that is marked as for whitewater use. Accordingly, with respect to the helmet 503, the second helmet may be the same model whitewater helmet as the helmet 503 used for testing at box 603. To apply the second impact configuration, the second helmet may be positioned on the headform 100 in replacement of the helmet 503 or on another headform. The second helmet is then impacted at a front, a rear, and a side, at three impact locations, similar to the impact locations of the helmet 503, but with a different impact velocity. In some embodiments, the second impact configuration may be applied to the same helmet that the first impact configuration was applied to. For instance, the helmet 503 used for testing at box 603 may be impacted at the above-mentioned three locations with one impact velocity, and the helmet 503 may be impacted again at the same three locations with a different impact velocity.

Different impact velocities are selected for the first impact configuration and the second impact configuration to replicate a medium and high energy impact. For example, the highest recorded flow rate of a river is 5 m/s. Accordingly, a velocity of 4.9 m/s may be selected as the impact velocity for one of the impact configurations as replicating a high energy impact. A velocity of 3.1 m/s may be selected as the impact velocity for one of the impact configurations as replicating a medium energy impact. Other impact velocities can also be relied upon. In some cases, a velocity of greater than 4.9 m/s may be selected to replicate a high energy impact, and a velocity of lower than 3.1 m/s may be selected to replicate a medium energy impact. If the second impact configuration is applied to the second helmet, each of the impact locations of the helmet 503 used in box 603 and the second helmet is impacted once to ensure that any deformation caused by testing does not affect any future tests. With this setup, application of the first impact configuration and the second impact configuration results in a total of six tests for a given helmet model for a total test matrix of 126 tests. The table below details headform translations and rotations that occur after each impact at the aforementioned three impact locations:

TABLE 2

Headform Translations and Rotations on the Sliding Mass 418 for each Test Condition.

| Location | Y (cm) | Z (cm) | Ry (deg) | Rz (deg) |
| --- | --- | --- | --- | --- |
| Front | 0 | +5.3 | −20 | 0 |
| Side | 0 | +5.8 | −5 | −100 |
| Back | 0 | +4.5 | 0 | −180 |

In box 609, acceleration data is generated by various accelerometers and sensors that can be positioned within a headform that is being used for impact testing. For example, the sensor package 118, which is positioned within the headform 100 near the center of gravity 116, may include accelerometers and angular rate sensors, among other IMUs. In one embodiment, the sensor package 118 includes a six degree of freedom (6DoF) sensor package that includes three accelerometers and a triaxial angular rate sensor. The three accelerometers can measure linear acceleration data, whereas the triaxial angular rate sensor may measure angular velocity data. In some embodiments, the sensor package 118 may also include angular accelerometers configured to measure angular acceleration, and also a different quantity of accelerometers and/or angular rate sensors. For each impact that occurs at the aforementioned impact locations, the sensor package 118 can generate linear acceleration data, angular velocity data, angular acceleration data, and other inertial measurement data. The computing device 121 may receive the generated data, including the acceleration data and angular velocity data, among other inertial measurement data, and process it as described herein. In cases where angular acceleration is not measured, the computing device 121 may determine the angular acceleration values based on differentiating the angular velocity data.

According to one example, the acceleration data and angular velocity data measured for each of the six impacts were sampled at 20,000 Hz and filtered using a 4-pole Butterworth low pass filter according to SAE J211 (Instrumentation for Impact Test), with a cutoff frequency of 1650 Hz (CFC 1000) for the accelerometer data and 256 Hz (CFC 155) for the angular rate sensor data, by the computing device 121. The angular acceleration values were determined by differentiating the angular rate data by the computing device 121. Resultant values were calculated for linear (g) and angular acceleration (rad/sec$^2$) by the computing device 121.

Moving onto box 612, the linear and angular acceleration values generated in step 609 may be used to determine concussion risk values by the computing device 121. For example, for each impact that occurs with respect to the first impact configuration and the second impact configuration discussed for steps 603 and 606, the computing device 121 is configured to calculate a concussion risk value based on the following function or equation:

$$R(a, \propto) = \frac{1}{1 + e^{-(-10.2 + 0.0433*a + 0.000873*\propto -0.000000920*a\propto)}} \quad \text{Eq. 1}$$

This equation, also referenced herein as the injury risk function or concussion risk function, outputs a concussion risk value based on resultant linear acceleration (a) and resultant angular acceleration ($\propto$). The concussion risk function includes use of both linear and angular acceleration data because they are both correlated and predictive of concussion. A multivariate logistic regression analysis can be used to model risk as a function of both linear and angular head acceleration. Using the concussion risk function enhances the data analysis by increasing the importance of higher acceleration impacts.

Moving onto box 615, exposure values are determined for each impact that occurs as part of the overall impact test. For example, referring back to the example with the first impact configuration being applied to the helmet 503 and the second impact configuration being applied to the second helmet that is the same model as the helmet 503, each impact location of the helmet 503 and the second helmet, with respect to the first impact configuration and second impact configuration discussed in steps 603 and 606, is impacted once to ensure that any deformation caused by testing does not affect any future tests. Thus, the exposure value for each impact is assigned a value of "one" for the first impact configuration and the second impact configuration. Further, each impact location is determined to be impacted only once since participants of whitewater activities typically only undergo one major head impact annually. However, exposure values may be assigned different values for impact tests in some cases where an impact location is impacted more than once. For example, in a sport such as football, an impact location on a helmet is likely to be impacted more than once during a single game. In such cases, the exposure values for an impact test may be assigned a number greater than one. Depending on the frequency of impacts occurring at a specific impact location for a given impact test, the exposure value may be assigned a whole number greater than one that is stored in the computing device 121.

In box 618, a concussion risk metric is determined for a helmet model based on the exposure values determined in step 615 and the concussion risk values determined in step 612. The concussion risk metric is determined based on the equation listed below:

$$\text{Whitewater STAR} = \sum_{L=1}^{3} \sum_{V=1}^{2} E(L, V) * R(a, \alpha), \quad \text{Eq. 2}$$

where E represents exposure, L represents impact locations, V represents impact velocity, and R represents concussion risk. With reference to the first and second impact configurations discussed in steps 603 and 606, individual concussion risk values for each of the six impacts are multiplied by corresponding exposure values. The multiplied concussion risk values and exposure values, also known as weighted concussion risk values, are summated together to generate an overall score, such as a STAR score. In some embodiments, the computing device 121 may perform the steps 612-618 to determine the STAR score for a given helmet model.

The STAR score for a given helmet model is then used to determine a corresponding rating or STAR rating. The STAR score is different from the STAR rating. The STAR rating may range up to five stars for the best available helmets. The STAR rating thresholds are determined based on the average STAR scores of tested helmets listed in Table 1. A 5-star rating threshold was set to a 50% reduction in STAR score relative to the mean STAR score for the tested whitewater helmets, and then each subsequent rating threshold was set in increments of 50% more concussion risk from the 5-star threshold (Table 3). For example, the 4-star threshold is 1.5 times the 5-star threshold, and the 3-star threshold is two times the 5-star threshold.

TABLE 3

Whitewater Star Rating Threshold Calculations

| Star Rating | Whitewater STAR Score Threshold | Calculations for Whitewater STAR Thresholds |
|---|---|---|
| 5 | <1.21 | 50% of the mean Whitewater STAR Score |
| 4 | <1.82 | 50% worse performance than 5-star threshold |
| 3 | <2.43 | 100% worse performance than 5-star threshold |
| 2 | <3.03 | 150% worse performance than 5-star threshold |
| 1 | <3.64 | 200% worse performance than 5-star threshold |

TABLE 3-continued

Whitewater Star Rating Threshold Calculations

| Star Rating | Whitewater STAR Score Threshold | Calculations for Whitewater STAR Thresholds |
|---|---|---|
| N.R. | ≥4.24 | 250% worse performance than 5-star threshold |

With respect to the first and second impact configurations discussed in steps 603-606, higher linear acceleration values were observed for the front impact conditions and higher angular acceleration values were observed the side impact conditions according to one example. In addition, the linear regression model between linear and angular acceleration was strongly correlated (R=0.84). However, there was a low correlation between helmet price and the STAR score (R=0.32), and there was also a low correlation between helmet mass and the STAR score (R=0.17).

When the impact tests were conducted with a 3.1 m/s impact velocity with a first helmet, the 21 helmeted tests (Table 1) tested resulted in a range of 30.2-131.2 g and 1601-5036 rad/sec$^2$ for the front impact condition. For the side impact condition, the 21 helmeted tests resulted in a range of 35.7-129.7 g, and 2500-3678 rad/sec$^2$. For the rear impact condition, the 21 helmeted tests resulted in a range of 27.2-152 g, and 1922-3991 rad/sec$^2$.

When the impact tests were conducted with a 4.9 m/s impact velocity with a second helmet that is the same model as the first helmet, the 21 helmeted tests resulted in a range of 82.0-282.5 g and 4024-13069 rad/sec$^2$ for the front impact condition. For the side impact condition, the 21 helmeted tests resulted in a range of 88.1-316.4 g and 5609-24563 rad/sec$^2$. For the rear impact condition, the 21 helmeted tests resulted in a range of 82.9-332.0 g, and 3336-14381 rad/sec$^2$. The tested helmets' STAR scores resulted in a range of 0.2518-4.8634.

Figure 7:
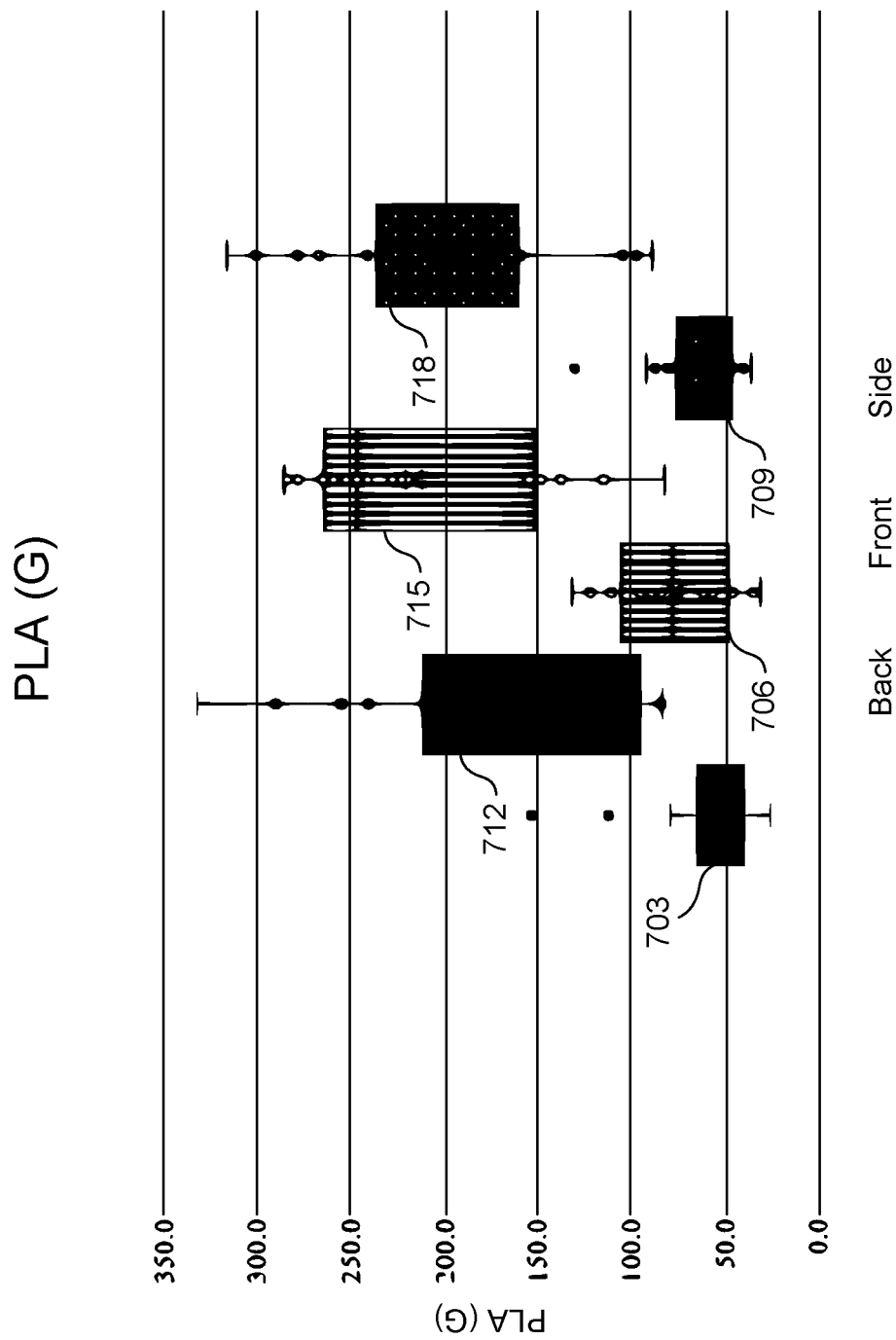
FIG. 7 is a chart illustrating peak resultant linear head acceleration (PLA) values resulting from six example impact tests that were conducted according to the steps described in FIG. 6 in accordance with various embodiments of the present disclosure.

FIG. 7 illustrates peak resultant linear (PLA) head acceleration values (g) for the above-mentioned six impact tests. Bar 703 represents the acceleration range for the rear impacts with the 3.1 m/s impact velocity. Bar 706 represents the acceleration range for the front impacts with the 3.1 m/s impact velocity. Bar 709 represents the acceleration range for the side impacts with the 3.1 m/s impact velocity. Bar 712 represents the acceleration range for the rear impacts with the 4.9 m/s impact velocity. Bar 715 represents the acceleration range for the front impacts with the 4.9 m/s impact velocity. Bar 718 represents the acceleration range for the side impacts with the 4.9 m/s impact velocity.

Figure 8:
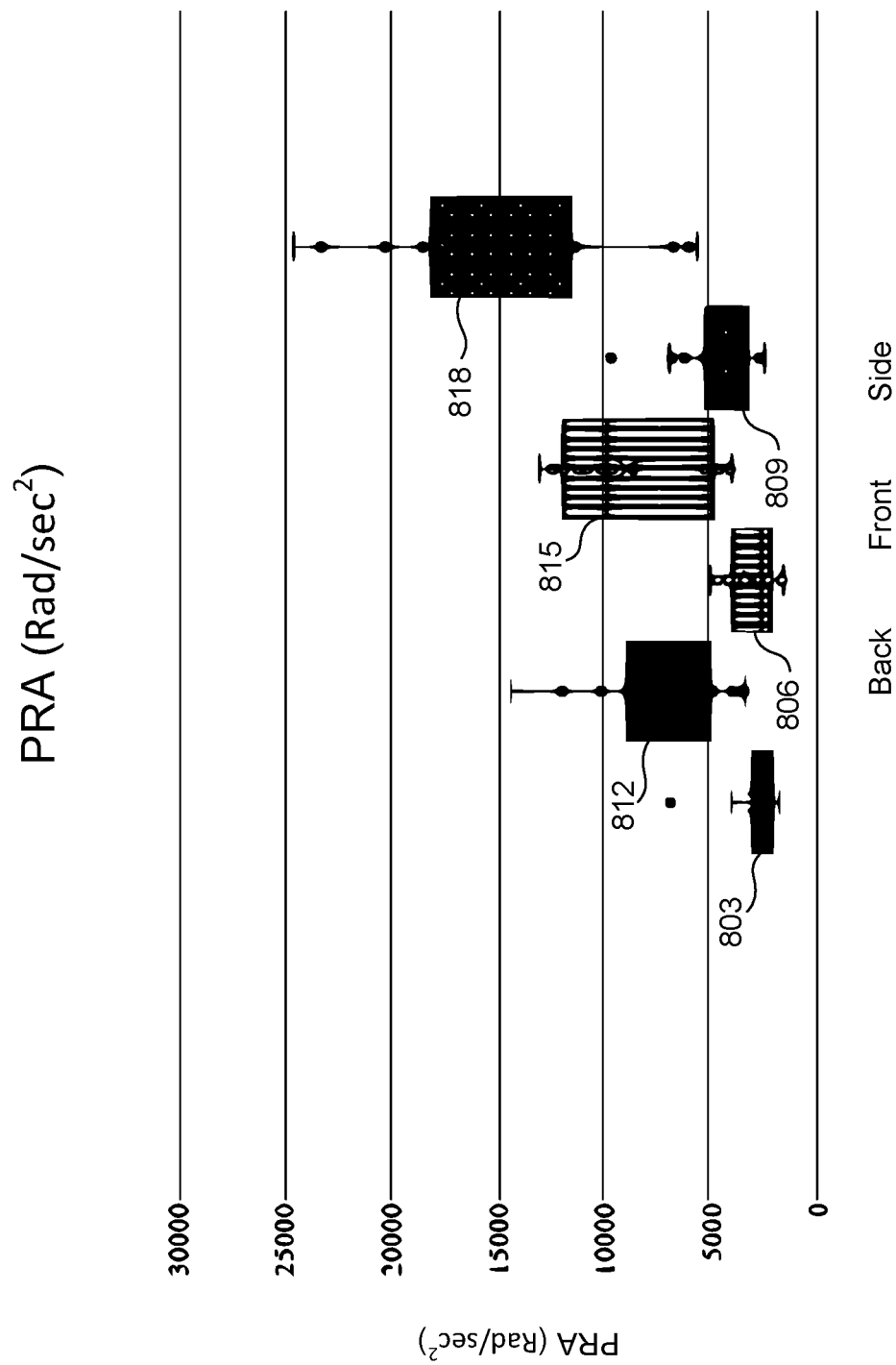
FIG. 8 is a chart illustrating peak resultant angular head acceleration (PRA) values resulting from the six example impact tests that were conducted according to the steps described in FIG. 6 in accordance with various embodiments of the present disclosure.
Figure 9:
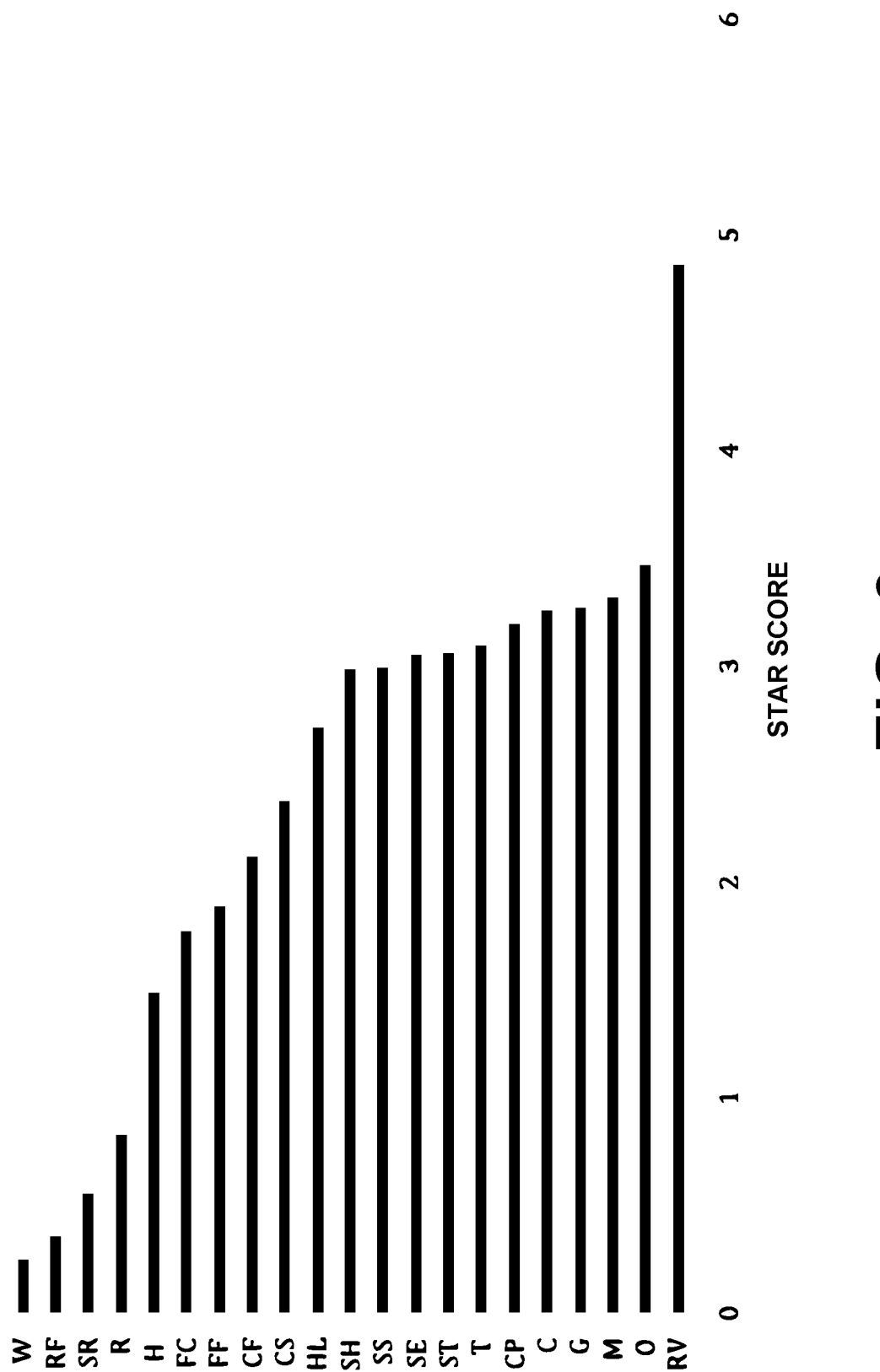
FIG. 9 is a chart showing scores for 21 helmets resulting from the six example impact tests that were conducted according to the steps described in FIG. 6 in accordance with various embodiments of the present disclosure.

FIG. 8 illustrates peak resultant angular (PRA) head acceleration values (rad/sec$^2$) for the above-mentioned six impact tests. Bar 803 represents the acceleration range for the rear impacts with the 3.1 m/s impact velocity. Bar 806 represents the acceleration range for the front impacts with the 3.1 m/s impact velocity. Bar 809 represents the acceleration range for the side impacts with the 3.1 m/s impact velocity. Bar 812 represents the acceleration range for the rear impacts with the 4.9 m/s impact velocity. Bar 815 represents the acceleration range for the front impacts with the 4.9 m/s impact velocity. Bar 818 represents the acceleration range for the side impacts with the 4.9 m/s impact velocity. FIG. 9 is a chart showing the STAR scores for each of the 21 helmets listed in Table 1 in relation to the above-mentioned six impact tests. Lower values indicate lower risk of injury.

The majority of the 21 whitewater helmets tested performed poorly given that the STAR scores observed for the helmets indicate a high probability of concussion for each impact (see FIG. 9). The helmets should reduce head acceleration by a far greater margin for lower concussion risks (FIGS. 7-8). For example, the STAR scores over three indicate that for the six impact conditions, over three concussions would be predicted. In contrast, the best helmets can reduce this value below one. In order to provide a useful tool for consumers to make informed decisions, the STAR scores for each helmet can be used to create the star rating from five stars for the best helmet to one star for the lowest performing helmets. Table 4 categorizes the 21 helmets that were tested based on the STAR score and the STAR rating:

TABLE 4

All 21 Helmet Models Related to their Respective Price, STAR Score, and STAR Rating.

| Manufacturer | Helmet Model | STAR Score | Rating |
|---|---|---|---|
| Sweet Protection | Wanderer Helmet | 0.25 | 5 |
| Sweet Protection | Rocker Fullface Helmet | 0.36 | 5 |
| Sweet Protection | Sweet Rocker - Dagger Edition | 0.55 | 5 |
| Shred Ready | Rocker Helmet | 0.83 | 5 |
| Shred Ready | Halfcut Whitewater Helmet | 1.46 | 4 |
| Shred Ready | Fullcut Whitewater Helmet | 1.77 | 4 |
| Shred Ready | Fullface Whitewater Helmet | 1.89 | 3 |
| NRS | Chaos Full Cut Helmet | 2.12 | 3 |
| NRS | Chaos Side Cut Helmet | 2.38 | 3 |
| NRS | Havoc Livery Helmet | 2.72 | 2 |
| Shred Ready | Shaggy Helmet | 2.99 | 2 |
| Shred Ready | Super Scrappy Helmet | 2.99 | 2 |
| Shred Ready | SESH Helmet | 3.06 | 1 |
| Sweet Protection | Strutter Helmet | 3.06 | 1 |
| WRSI | Trident Composite | 3.10 | 1 |
| WRSI | Current Pro | 3.20 | 1 |
| WRSI | Current | 3.26 | 1 |
| Gath | Gath Gedi | 3.28 | 1 |
| WRSI | Moment Fullface | 3.32 | 1 |
| Shred Ready | Outfitter Pro Helmet | 3.48 | 1 |
| Gath | Gath RV | 4.86 | N.R.* |

*N.R. stands for Not Recommended

Higher acceleration values for both linear and angular acceleration were observed at higher impact speeds, with linear and angular acceleration being strongly correlated (R=0.84). Linear acceleration was observed to be higher in the front impact conditions, whereas angular acceleration was observed to be higher in the side impact conditions. A possible cause for this observation is the difference in centric and non-centric aspects for each impact location.

Helmet performance did not correlate well with other factors such as weight (R=0.11) and price (R=0.32). This highlights the benefits of a helmet rating system, because consumers cannot always use weight or price as an indication of helmet performance. Moreover, all five of the manufacturers produced helmets that were 1 star rated, while only one of the manufacturers produced five star rated helmets.

The high risk of head injury across the majority of whitewater helmets could be responsible for the high head injury rates and mortality rates observed in whitewater kayaking and rafting. The whitewater helmets should reduce the head impact accelerations much more across all helmets to potentially reduce the number of injuries in whitewater sports. A limitation of the six impacts discussed for the first impact configuration and the second impact configuration (FIG. 6) can be that that only one size of helmet may be tested. Such testing conditions assume that performance is consistent throughout each size of helmet. However, there still could be deviation in performance as size increases or decreases due to potential changes in padding configuration and thickness. Accordingly, further embodiments of the present disclosure may include testing helmets of different sizes and/or weight, with the helmets being the same model. Additional embodiments may include testing helmets designated for different sexes (e.g., male or female) of the same model.

Many researchers have been using lab head impact data alongside computer models that simulate brain tissue strain. The linear and angular head acceleration data discussed herein may be utilized with computer models. This would allow for a better understanding of whitewater head injury response specifically in relation to brain deformation. Computer modeling has also been used in helmet research to design optimized helmet prototypes. These techniques could be applied to the whitewater kayaking and rafting head injury mechanisms to develop a helmet that is able to substantially reduce head injury risk.

The flowchart of FIG. 6 shows an exemplary implementation of the methods described herein, as applied to testing for concussion mitigation performance of helmets. Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method of determining an injury risk metric of a watersport helmet, comprising:
   applying a first impact configuration to the watersport helmet with a first impact velocity, the first impact configuration consisting of a first single impact to a front of the watersport helmet at the first impact velocity, a second single impact to a side of the watersport helmet at the first impact velocity, and a third single impact to a rear of the watersport helmet at the first impact velocity, the first impact velocity ranging from 4.8 meters per second to 5.0 meters per second;
   applying a second impact configuration to a second watersport helmet with a second impact velocity, the second watersport helmet being a same model as the watersport helmet, the second impact configuration consisting of a first single impact to a front of the second watersport helmet at the second impact velocity, a second single impact to a side of the second watersport helmet at the second impact velocity, and a third single impact to a rear of the second watersport helmet at the second impact velocity;

identifying a plurality of linear and angular acceleration values associated with the first and the second impact configurations, the plurality of linear and angular acceleration values comprising a respective linear acceleration value and a respective angular acceleration value associated with each respective impact of the first and the second impact configurations;

determining a plurality of injury risk values associated with the first and the second impact configurations, the plurality of injury risk values comprising a respective injury risk value for each respective impact of the first and the second impact configurations, wherein each respective injury risk value of the plurality of injury risk values is determined based on the respective linear acceleration value and the respective angular acceleration value associated with each respective impact of the first and the second impact configurations;

determining a plurality of exposure values for the watersport helmet and the second watersport helmet, the plurality of exposure values being associated with the first and the second impact configurations, the plurality of exposure values comprising a respective exposure value for each respective impact of the first and the second impact configurations, wherein each respective exposure value of the plurality of exposure values comprises a whole number value equal to one denoting a single impact occurred at each respective impact location associated with each respective impact of the first and the second impact configurations; and determining the injury risk metric based on the plurality of injury risk values and the plurality of exposure values, the injury risk metric being associated with injury performance mitigation data for the watersport helmet.

2. The method of claim 1, wherein applying the first impact configuration comprises positioning the watersport helmet on a headform, the headform being mounted on a neck using an adaptor to locate a center of gravity of the headform.

3. The method of claim 2, wherein applying the first impact configuration comprises mounting the headform on a sliding mass that simulates an effective torso mass of a human during a head impact, the sliding mass being mounted to an adjustable table.

4. The method of claim 3, wherein the human comprises a $50^{th}$ percentile male.

5. The method of claim 2, wherein the plurality of linear and angular acceleration values are generated by a six degrees of freedom (6DoF) sensor package located near the center of gravity.

6. The method of claim 5, wherein the 6DoF sensor package comprises three accelerometers and a triaxial angular rate sensor.

7. The method of claim 1, wherein determining the plurality of injury risk values further comprises performing a logistic regression analysis as a function of the plurality of linear and angular acceleration values.

8. The method of claim 1, wherein the first impact velocity is approximately 4.9 meters per second (m/s) and the second impact velocity ranges from approximately 2.2 to 3.2 m/s.

9. The method of claim 1, wherein the first impact configuration and the second impact configuration are applied using a pendulum impactor.

10. The method of claim 9, wherein the pendulum impactor comprises an arm, a pivot point, and an impactor surface.

11. The method of claim 10, wherein the impactor surface is curved.

12. The method of claim 1, wherein determining the injury risk metric further comprises:
multiplying the respective injury risk values to the respective exposure values to determine a plurality of weighted injury risk values; and
aggregating the plurality of weighted injury risk values.

13. The method of claim 1, wherein the respective exposure values for the respective impacts of the first and the second impact configurations are equal.

14. The method of claim 12, further comprising categorizing the aggregated plurality of weighted injury risk values into a rating system, the rating system comprising a numerical range with a plurality of numerical threshold levels.

15. The method of claim 1, wherein the watersport helmet and the second watersport helmet are of a different size or weight.

16. The method of claim 1, further comprising modeling the plurality of linear and angular acceleration values to establish a connection between a head injury response in relation to brain deformation.

17. A method of determining an injury risk metric of a watersport helmet, comprising:
applying a first impact configuration to the watersport helmet with a first impact velocity, the first impact configuration consisting of a first single impact to a front of the watersport helmet at the first impact velocity, a second single impact to a side of the watersport helmet at the first impact velocity, and a third single impact to a rear of the watersport helmet at the first impact velocity;

applying a second impact configuration to the watersport helmet with a second impact velocity, the second impact configuration consisting of a fourth single impact to the front of the watersport helmet at the second impact velocity, a fifth single impact to the side of the watersport helmet at the second impact velocity, and a sixth single impact to the rear of the watersport helmet at the second impact velocity, the second impact velocity ranging from 4.8 meters per second to 5.0 meters per second;

generating a plurality of linear and angular acceleration values associated with the first and the second impact configurations, the plurality of linear and angular acceleration values comprising a respective linear acceleration value and a respective angular acceleration value associated with each respective impact of the first and the second impact configurations;

determining a plurality of injury risk values associated with the first and the second impact configurations, the plurality of injury risk values comprising a respective injury risk value for each respective impact of the first and the second impact configurations, wherein each respective injury risk value of the plurality of injury risk values is determined based on the respective linear acceleration value and the respective angular acceleration value associated with each respective impact of the first and the second impact configurations;

determining a plurality of exposure values for the watersport helmet, the plurality of exposure values being associated with the first and the second impact configurations, the plurality of exposure values comprising a respective exposure value for each respective impact of the first and the second impact configurations, wherein each respective exposure value of the plurality of exposure values comprises a whole number value equal to one denoting a single impact occurred at each respective impact location associated with each respective impact of the first and the second impact configurations; and determining the injury risk metric based on aggregating the plurality of injury risk values, the injury risk metric being associated with injury performance mitigation data for the watersport helmet.

18. The method of claim 17, wherein applying the first impact configuration comprises positioning the watersport helmet on a headform, the headform being mounted on a neck using an adaptor to locate a center of gravity of the headform.

19. The method of claim 17, wherein the first impact configuration and the second impact configuration are applied using a pendulum impactor.

20. The method of claim 17, further comprising categorizing the aggregated plurality of injury risk values into a rating system, the rating system comprising a numerical range with a plurality of numerical threshold levels.

* * * * *